United States Patent
Hanebuth et al.

(10) Patent No.: US 9,515,354 B2
(45) Date of Patent: Dec. 6, 2016

(54) ENERGY STORE AND METHOD OF CHARGING OR DISCHARGING AN ENERGY STORE

(75) Inventors: Marc Hanebuth, Nürnberg (DE); Sylvio Kosse, Erlangen (DE); Uwe Lenk, Zwickau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 404 days.

(21) Appl. No.: 14/128,597

(22) PCT Filed: Jun. 13, 2012

(86) PCT No.: PCT/EP2012/061177
§ 371 (c)(1),
(2), (4) Date: Dec. 21, 2013

(87) PCT Pub. No.: WO2013/000706
PCT Pub. Date: Jan. 3, 2013

(65) Prior Publication Data
US 2014/0125288 A1      May 8, 2014

(30) Foreign Application Priority Data
Jun. 27, 2011   (EP) .............................. 102011078116

(51) Int. Cl.
*H02J 7/00*      (2006.01)
*H01M 10/44*   (2006.01)
(Continued)

(52) U.S. Cl.
CPC ......... *H01M 10/44* (2013.01); *H01M 8/04014* (2013.01); *H01M 8/12* (2013.01);
(Continued)

(58) Field of Classification Search
USPC ......................................................... 320/128
See application file for complete search history.

(56) References Cited

U.S. PATENT DOCUMENTS

| 3,416,966 A | 12/1968 | Oswin |
| 4,039,729 A | 8/1977 | Benczur-Uermoessy |

(Continued)

FOREIGN PATENT DOCUMENTS

| DE | 2232055 A1 | 1/1974 |
| DE | 2422577 A1 | 11/1975 |

(Continued)

*Primary Examiner* — Robert Grant
(74) *Attorney, Agent, or Firm* — Beusse Wolter Sanks & Maire

(57) ABSTRACT

An energy store is provided having a first electrode, a second electrode, an electrolyte in between, a first redox pair having a first oxidation reactant and a first oxidation product, and a housing, wherein a fluidic redox pair is present in the housing and comprises a fluidic oxidation reactant and a fluidic oxidation product, wherein during the discharge of the energy store, the fluidic oxidation product is reduced, and wherein during the charging of the energy store, the fluidic oxidation reactant is oxidized, wherein the fluidic redox pair in the housing is gaseous, and a pump or a compressor is adapted such that the fluidic redox pair within the housing is held at a pressure which is above the ambient pressure outside the housing. A method for charging or discharging an energy store is also provided.

12 Claims, 4 Drawing Sheets

(51) Int. Cl.
  *H01M 8/04* (2016.01)
  *H01M 8/12* (2016.01)
  *H01M 8/18* (2006.01)
  *H01M 8/20* (2006.01)
  *H01M 12/08* (2006.01)

(52) U.S. Cl.
  CPC ............ *H01M 8/18* (2013.01); *H01M 8/184* (2013.01); *H01M 8/186* (2013.01); *H01M 8/188* (2013.01); *H01M 8/20* (2013.01); *H01M 12/08* (2013.01); H01M 2008/1293 (2013.01); *Y02E 60/521* (2013.01); *Y02E 60/525* (2013.01); *Y02E 60/528* (2013.01)

(56) References Cited

U.S. PATENT DOCUMENTS

| | | | |
|---|---|---|---|
| 4,204,033 A | | 5/1980 | Meissner |
| 5,492,777 A | * | 2/1996 | Isenberg ................ C01B 3/061 |
| | | | 429/221 |
| 2013/0034784 A1 | | 2/2013 | Landes |

FOREIGN PATENT DOCUMENTS

| | | |
|---|---|---|
| DE | 2057446 C3 | 11/1981 |
| DE | 3117660 C2 | 8/1984 |
| DE | 102009057720 A1 | 6/2011 |
| GB | 1443163 | 7/1976 |

\* cited by examiner

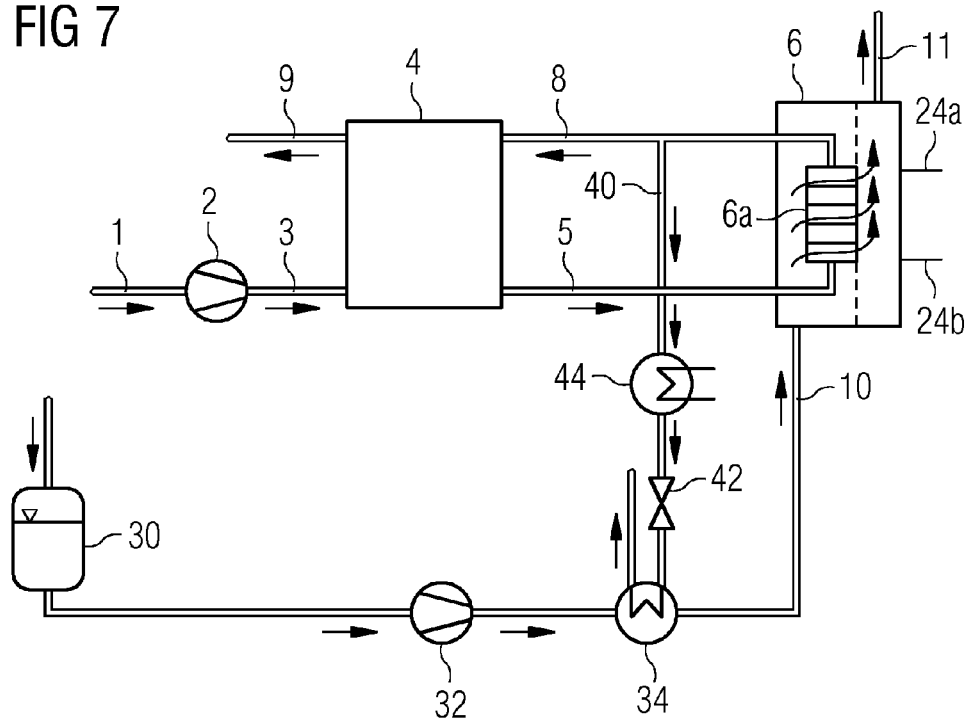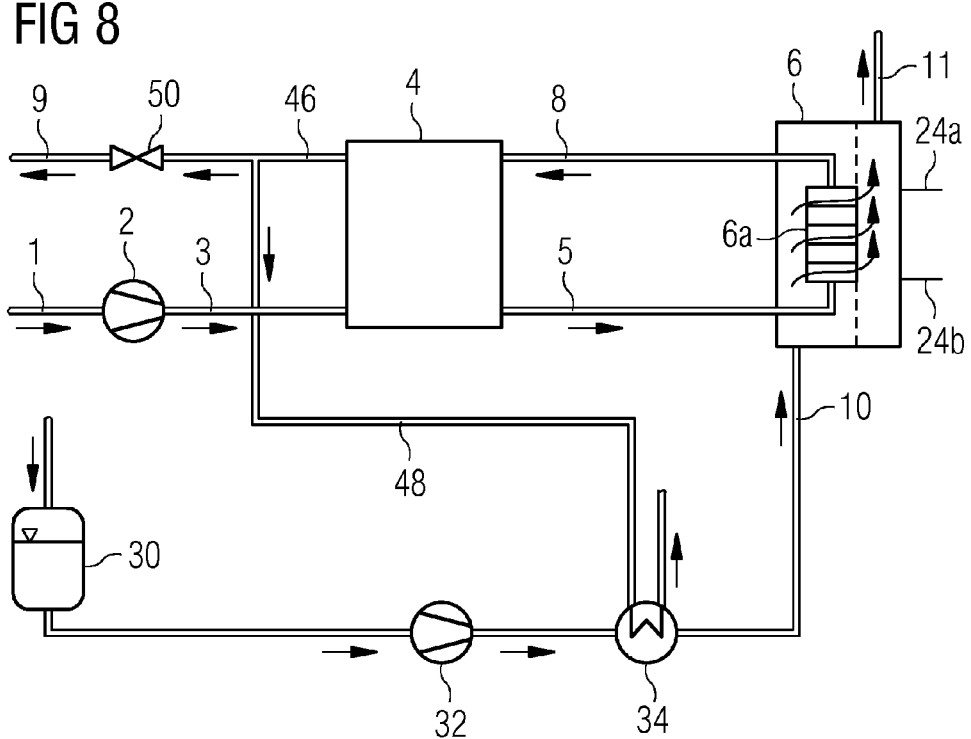

ENERGY STORE AND METHOD OF CHARGING OR DISCHARGING AN ENERGY STORE

CROSS REFERENCE TO RELATED APPLICATIONS

This application is the U.S. National Stage of International Application No. PCT/EP2012/061177 filed Jun. 13, 2012, and claims the benefit thereof. The International Application claims the benefit of German Application No. DE 102011078116.1 filed Jun. 27, 2011. All of the applications are incorporated by reference herein in their entirety.

FIELD OF INVENTION

The present invention relates to an energy store for storing and releasing electric energy. In addition, the invention relates to a method for charging or discharging an energy store of this kind.

BACKGROUND OF INVENTION

Energy stores for storing and releasing electric energy are of great significance for many mobile applications, for example. While the storage capacity of modern energy stores for storing electric energy is sufficient for the operation of relatively small devices, such as mobile phones, portable computers etc., energy stores for storing electric energy for larger applications, such as electrically driven motor vehicles, are still subject to shortcomings which stand in the way of their commercially successful use. The storage capacity of the batteries used, in particular, does not yet meet the aimed-for standards. Although lithium-ion batteries, for example, achieve good results for use in mobile phones or computers for instance, they are of only limited suitability for applications requiring a large amount of energy, such as electrically operated motor vehicles. Here, the storage capacity of lithium ion batteries represents a limiting factor, e.g. for the range of an electric motor vehicle.

In the motor vehicle sector, in particular, there are furthermore known systems in which the energy required for driving is stored in the form of hydrogen. By means of a fuel cell, the hydrogen is then converted into electric current, by means of which the motor can be driven. However, the construction of a refueling network for hydrogen is necessary for such a technology, and this makes the introduction of this technology expensive, especially in view of the high safety requirements of refueling stations because of the risk of explosions.

More recently, batteries in which the electric energy is stored in the form of an oxidation state of a metal have furthermore also been considered. The construction of a battery of this kind corresponds approximately to that of a fuel cell with a solid electrolyte. The electrolyte is arranged between two electrodes, one of which is an air electrode composed of a material which cleaves the atmospheric oxygen and conducts the oxygen ions formed in the process to the electrolyte. The electrolyte is likewise produced from a material which can conduct oxygen ions. Arranged on the opposite side thereof from the air electrode is the second electrode, which is composed of a metal or metal oxide to be oxidized and reduced. The battery is discharged by a process in which the metal is oxidized by means of oxygen ions from the atmospheric oxygen, and is charged by a process in which the metal is reduced upon application of a voltage, releasing oxygen ions, wherein the oxygen ions then migrate through the electrolyte to the air electrode, from where they are released to the surroundings as molecular oxygen. This process is illustrated schematically in FIG. 1, in which the upper half illustrates the discharge process and the lower half illustrates the charging process. In this figure, reference numeral 101 denotes the battery, reference numeral 103 denotes the air electrode, reference numeral 105 denotes the metal or metal oxide, reference numeral 107 denotes the electrolyte, reference numeral 109 denotes a load supplied with current as the battery is discharged, and reference numeral 111 denotes a power source used in the charging of the battery.

The aim is to improve the power density of the batteries described in order to implement the system with a minimum size and maximum economy. It is important here to prevent unwanted oxidation of the metal due to penetration of air into the battery. Air penetration in the region of the metal electrode leads to power losses extending as far as complete failure of the battery, depending on the quantity of air which has penetrated.

The electrolytes used in the batteries exhibit highly selective oxygen ion conduction but require relatively high operating temperatures, typically 600° C. or above. At such temperatures, sealing the battery against air penetration requires a lot of design effort and a high outlay on materials since many sealing materials cannot be used, owing to the high temperatures.

Cited documents U.S. Pat. No. 5,492,777, DE102009057702A1 and U.S. Pat. No. 4,204,033 describe energy stores having solid electrolytes and iron as the oxidizable material for energy storage. Moreover, steam/hydrogen gas are used as a redox pair in the energy stores. DE 102009057702A furthermore describes that the partial pressure of the hydrogen gas is 1 bar and the partial pressure of the steam is $10^{-3}$ bar.

SUMMARY OF INVENTION

It is an object herein to provide an advantageous method for charging or discharging an energy store, in which the energy is stored in the oxidation state of a redox pair. Another object is to provide an advantageous energy store in which the electric energy is stored in the oxidation state of a redox pair.

According to embodiments herein, a method for charging or discharging an energy store is provided. The energy store is provided with a first electrode, which, by donating electrons to a component of a process fluid, can produce anions from said component or, by accepting electrons from anions, can consume said anions by neutralization of the charge thereof and release to the process fluid, a second electrode, which, by releasing electrons, can produce anions or, by accepting electrons, can consume anions, an electrolyte, which is arranged between the first electrode and the second electrode and conducts anions, and a first redox pair, which comprises a first oxidation reactant and a first oxidation product. To charge the energy store, the first oxidation product is reduced, and, to discharge the energy store, the first oxidation reactant is oxidized, wherein use is made of a fluidic redox pair which comprises a fluidic oxidation reactant and a fluidic oxidation product and is in contact with the first redox pair and the second electrode. During the discharge of the energy store, the fluidic oxidation product is reduced to the fluidic oxidation reactant at the first oxidation reactant, producing the first oxidation product in the process, and the fluidic oxidation reactant is oxidized to the fluidic oxidation product at the second electrode by means of the anions, donating electrons to the second electrode in the process. During the charging of the energy store, the fluidic oxidation reactant is oxidized to the fluidic oxidation product at the first oxidation product, producing the first oxidation reactant in the process, and the fluidic oxidation product is reduced to the fluidic oxidation reactant at the second electrode, wherein anions are generated at the second electrode by accepting electrons from the second electrode. In other words, the oxidation and reduction of the first redox pair, which stores the electric energy, is not accomplished directly by means of the anions passing through the electrolyte but by means of the oxidation product and of the oxidation reactant, respectively, of the fluidic redox pair. During the oxidation and reduction, the fluidic redox pair is gaseous. Moreover, a pressure above the ambient pressure of the medium surrounding the energy store is maintained in the fluidic redox pair.

Surprisingly, the use of a second fluidic redox pair makes it possible to improve the reaction kinetics in the energy store, this being associated with an increase in the power density of the energy store. This applies particularly when the fluidic redox pair is gaseous during the oxidation and reduction. Thus, for example, it has been found that, when the first redox pair comprises a metal and the oxide thereof or two different oxidation stages of a metal, and the fluidic redox pair comprises steam as an oxidation product, the reaction kinetics in the energy store are clearly enhanced and the power density rises significantly.

If, moreover, a pressure above the ambient pressure of the medium surrounding the energy store is maintained in the fluidic redox pair, sealing against air penetration is also effected since the fluidic redox pair emerges from the energy store at unsealed locations and thus prevents the ingress of ambient gases, in particular air.

In the context of the method according to the invention, it is possible, in particular, for the fluidic redox pair to be passed along the first redox pair, wherein it can be passed along in a continuous flow or in pulses. In this way it is possible to avoid a situation where the quantity of the fluidic redox pair present in the energy store falls due to leaks. Over time, a fall in the quantity of fluidic redox pair would lead to the pressure of the fluidic redox pair in the energy store falling to ambient pressure and hence to the sealing function no longer being performed reliably.

In order to be able to replace the quantity of the fluidic redox pair which is lost through leaks, the energy store can be assigned a reservoir of fluidic redox pair. The quantity of the fluidic redox pair which has been lost can then be replaced from this reservoir via a feed line leading into the energy store. If, in addition to the feed line for feeding in the fluidic redox pair, there is also a discharge line for discharging the fluidic redox pair from the energy store, the fluidic redox pair can be circulated in a circuit and, as it circulates, can be passed along the first redox pair. The quantity of fluidic redox pair discharged from the energy store can then be fed back to the reservoir. However, a discharge line for discharging a quantity of the fluidic redox pair may be expedient even if there is no circuit.

When the volume flow of fluidic redox pair is low and there is a sufficient reservoir of fluidic redox pair, the quantity discharged can simply be released into the surroundings, if the fluidic redox pair comprises steam as the oxidation product, for example. Water or steam can be easily replaced and is harmless to the environment, and therefore there is nothing against discharge into the environment. Nevertheless, a circuit is advantageous since the frequency with which the fluidic redox pair has to be replenished is then lower.

If a gaseous fluidic redox pair is passed along the first redox pair, there is the possibility of holding a supply of the oxidation product and/or the oxidation reactant of the fluidic redox pair in liquid form. In this case, the liquid oxidation product and/or the liquid oxidation reactant is/are evaporated before it/they is/are passed to the first redox pair. Storage in liquid form has the advantage that only a relatively small storage volume has to be kept available in comparison with storage in gaseous form.

Typically, the energy store is held at a high temperature. This temperature is 600° C. or above. The temperature of the process fluid emerging from the energy store is therefore normally of the order of 600° C. The energy required for evaporating the oxidation product and/or the oxidation reactant of the fluidic redox pair can therefore be obtained from the waste heat of the process fluid, for example. The quantity of heat stored in the emerging process fluid is suitable for bringing about evaporation for a large number of possible fluidic redox pairs. Particularly when steam is used, the temperature is more than sufficient to bring about the evaporation process.

If the energy store is held at a high temperature, it is advantageous if the process fluid fed to the energy store is heated before being fed to the energy store. This heating can likewise be accomplished by means of the waste heat contained in the process fluid after leaving the energy store. The energy required for evaporating the oxidation product and/or the oxidation reactant of the fluidic redox pair can then be obtained, in the case of many suitable redox pairs, in particular in the case of steam as an oxidation product, from the residual heat still contained in the discharged process fluid after the heating of the process fluid.

The oxidation product and/or the oxidation reactant of the fluidic redox pair can be recondensed after it/they has/have been passed along the first redox pair. Condensation is advantageous particularly when the fluidic redox pair is circulated in a circuit and is held in storage in the form of the liquid oxidation product and/or of the liquid oxidation reactant.

According to a second aspect of the invention, an energy store is made available. An energy store of this kind comprises a first electrode, which is arranged in such a way that a process fluid can be guided along it and which comprises a material which, by donating electrons to a component of the process fluid, can produce anions from said component or, by accepting electrons from anions, can consume said anions by neutralization of the charge thereof and release to the process fluid; a second electrode comprising a material which, by releasing electrons, can produce anions or, by accepting electrons, can consume anions; an electrolyte, which is arranged between the first electrode and the second electrode and conducts anions; a first redox pair, which comprises a first oxidation reactant and a first oxidation product, e.g. a metal and the oxide thereof or two different oxidation stages of a metal; and a housing, which is sealed against the entry of the medium surrounding the housing but allows the supply of process fluid to the first electrode. For example, the first electrode can be designed as part of the outer wall of the housing. As an alternative, there is also the possibility to enable the supply and discharge of process fluid to and from the first electrode by means of at least one process fluid duct present in the housing and leading along the first electrode. A fluidic redox pair is present in the interior of the housing between the second electrode, on the one hand, and the first redox pair, on the other hand, and comprises a fluidic oxidation reactant and a fluidic oxidation product. During the discharge of the energy store, the fluidic oxidation product is reduced to the fluidic oxidation reactant at the first oxidation reactant, producing the first oxidation product in the process, and the fluidic oxidation reactant is oxidized to the fluidic oxidation product at the second electrode by means of the anions, donating electrons to the second electrode in the process. During the charging of the energy store, the fluidic oxidation reactant is oxidized to the fluidic oxidation product at the first oxidation product, producing the first oxidation reactant in the process, and the fluidic oxidation product is reduced to the fluidic oxidation reactant at the second electrode, wherein anions are generated at the second electrode by accepting electrons from the second electrode.

The fluidic redox pair in the housing is gaseous. In addition, there is a pump or a compressor with which the fluidic redox pair within the housing is held at a pressure above the ambient pressure outside the housing. With the aid of the fluidic redox pair, the reaction kinetics of the energy store can be improved. It is particularly advantageous in respect of the reaction kinetics if the fluidic redox pair is gaseous. Moreover, the housing can be sealed off against air penetration by means of the fluidic redox pair if there is a pump or a compressor, with which the fluidic redox pair within the housing can be held at a pressure which is above the ambient pressure outside the housing.

The housing can have at least one feed line for feeding in the fluidic redox pair, thereby making it possible to replace a quantity of fluidic redox pair which has been lost owing to leaks in the housing. There can furthermore also be at least one discharge line for discharging the fluidic redox pair, allowing the formation of a circuit for the fluidic redox pair.

If the first redox pair comprises a metal and the oxide thereof or two different oxidation stages of a metal, steam, for example, can be used as the oxidation product of the fluidic redox pair. The use of steam leads to good results in respect of improving the reaction kinetics. Moreover, steam is easy to procure and is particularly advantageous in respect of avoiding environmental stress if it escapes from the housing.

In order to be able to hold a large quantity of fluidic redox pair in storage with a small storage volume, it is advantageous if there is an evaporator, which converts the fluidic redox pair from the liquid state to the gaseous state and which has a gas outlet connected via the feed line to the housing (steam outlet in the case of steam as the oxidation product of the fluidic redox pair). The evaporator can be electrically heated, for example. If the energy store has a high temperature, the electric heating of the evaporator can be replaced by a heat exchanger, through which the liquid oxidation product and/or the liquid oxidation reactant of the fluidic redox pair flow/flows and to which process fluid that has emerged from the energy store is fed by means of a process fluid branch line in order to transfer waste heat to the liquid oxidation product and/or the liquid oxidation reactant. Since the temperatures of the energy store are generally 600° C. or above, the waste heat is sufficient to make a large number of possible fluidic redox pairs evaporate. In the case, in particular, of water as the oxidation product of the fluidic redox pair, the quantity of heat present in the process fluid that has emerged is much more than sufficient to bring about evaporation. In particular, the quantity of heat is also sufficient to preheat process fluid flowing into the energy store, in addition to evaporating the oxidation product and/or the oxidation reactant of the fluidic redox pair.

If water is used as the oxidation product of the fluidic redox pair, it is advantageous if it is partially or fully demineralized in order to avoid deposits in the evaporator.

The energy store according to the invention is suitable, in particular, for carrying out the method according to the invention, and therefore the advantages mentioned with reference to the method can be achieved therewith.

BRIEF DESCRIPTION OF THE DRAWINGS

Further features, characteristics and advantages of the present invention will become apparent from the following description of embodiment examples and by reference to the attached figures, of which:

FIG. 7 shows the energy store from FIG. 5 with an evaporator which is operated by means of the waste heat of the process fluid.

FIG. 8 shows an alternative embodiment of an energy store from FIG. 5 having an evaporator for the fluidic redox pair, which is operated using waste heat from the process fluid.

DETAILED DESCRIPTION OF INVENTION

Figure 3:
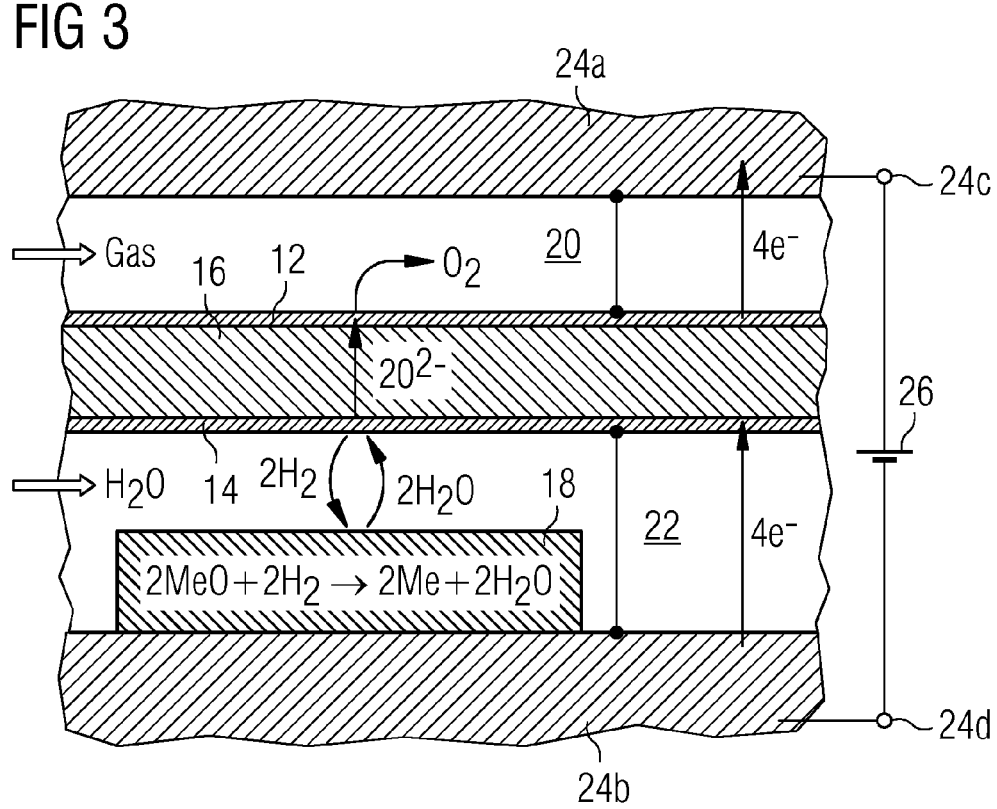
FIG. 3 shows schematically the internal structure of the energy store from FIG. 2 and the charging process.
Figure 4:
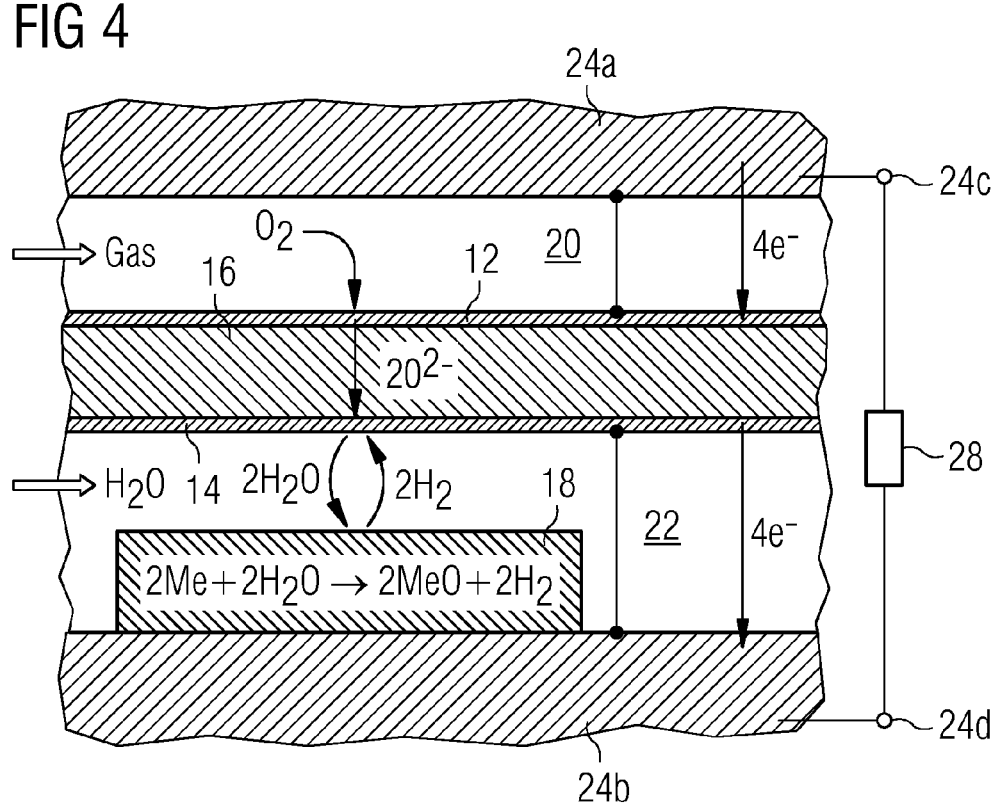
FIG. 4 shows the discharge process of the energy store from FIG. 2.

The basic structure of the energy store according to the invention and the charging process and discharge process will be explained in greater detail below with reference to FIGS. 2 to 4. The explanation is given with reference to the example of an energy store in which oxygen-containing process gas, typically air, is used as the process fluid. While the focus in FIG. 2 is on the external configuration of the energy store, including the air and steam supply systems thereof, the focus in FIGS. 3 and 4 is on the internal structure of the energy store, although the latter is illustrated only schematically, and on the processes that take place during the charging and discharging of the energy store.

Figure 1:
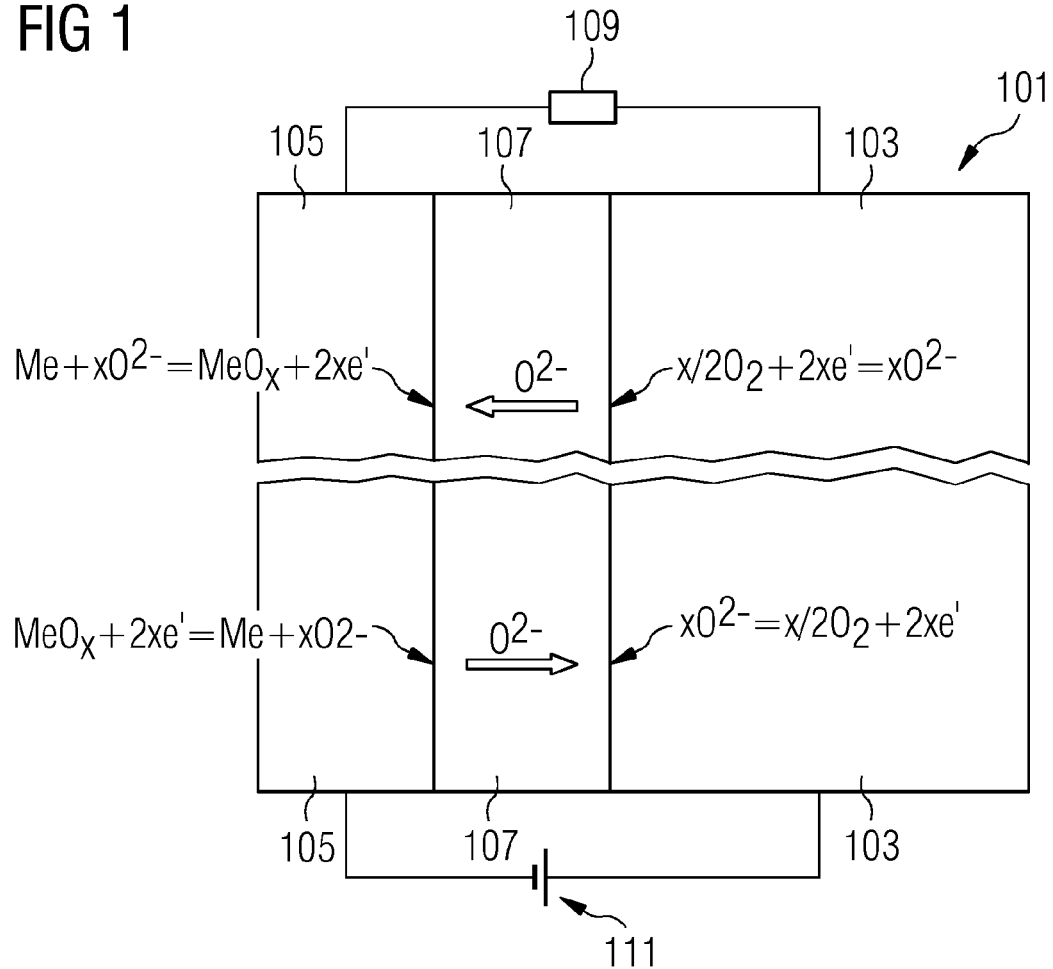
FIG. 1 shows the charging and discharging of an energy store based on the oxidation and reduction of a metal.
Figure 2:
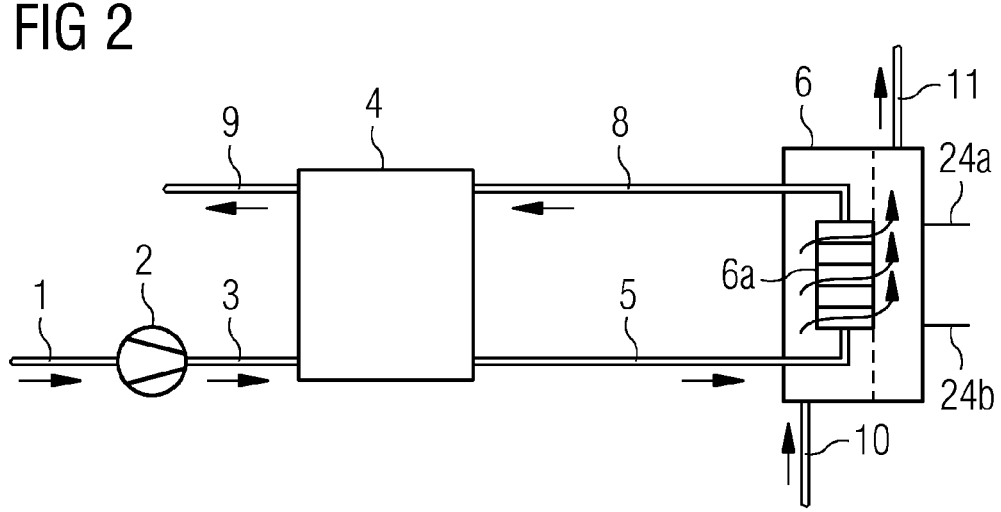
FIG. 2 shows the basic construction of an energy store according to the invention, including a system for feeding in the process fluid and the fluidic redox pair.

The energy store shown in FIG. 2 comprises an air inlet 1, which leads to a blower 2, which passes air to a heat exchanger 4 via a line 3. There, the air is preheated and is passed via a further line 5 into a housing 6 which, in the embodiment example under consideration, is designed as a thermally insulated high-temperature chamber. To discharge the air from the high-temperature chamber, there is an exhaust line 8, which leads to the heat exchanger 4. There, heat is removed from the exhaust air in order to preheat the air flowing into the high-temperature chamber 6. From the heat exchanger 4, the exhaust air 9 is released into the surroundings.

Within the high-temperature chamber 6 there is at least one cell stack 6a comprising a number of cells connected electrically in series, wherein each cell has as principal components an air electrode 12, a second electrode 14, a solid electrolyte 16 arranged between the two electrodes 12, 14, a metallic and/or oxidic store 18, a process fluid duct 20, which is a process gas duct in the embodiment example under consideration, and a steam duct 22. A cell of the cell stack 6a is shown in FIGS. 3 and 4. Between the cells there are interconnectors 24a, 24b, of which one is in electrical contact with the air electrodes 12 and one is in electrical contact with the second electrodes 14 and which are insulated with respect to one another. At both ends of the cell stack 6a, there are end plates. While one end plate makes electrical contact with the interconnector 24a which is connected to the air electrode 12, the other end plate makes contact with the interconnector 24b which is connected to the second electrode 14. The end plates furthermore have electric terminals 24c, 24d, which enable the electric circuit to be closed outside the energy store. Moreover, the end plates and the edges of the interconnectors 24a, 24b can be part of the housing.

In the present case, by way of example, the metal of the store 18 is bivalent. However, other valences are also possible in principle. Iron (Fe), nickel (Ni), copper (Cu), manganese (Mn), vanadium (V) etc., for example, have suitable oxidation states. The metal forms the oxidation reactant of a first redox pair, which is used for energy storage. The oxidation product is then the metal oxide, being iron(II) oxide (FeO) in the case of iron, for example.

The air electrode (first electrode) 12 has various purposes. It exchanges molecular oxygen with the process gas, electrons with interconnector 24a or the associated end plate and oxygen ions with the electrolyte. The requirements on the material and the structure as well as technical solutions are known from the prior art relating to high temperature fuel cells (Solid Oxide Fuel Cell, SOFC). One example of a material which meets the requirements is lanthanum—strontium-manganite, LSM for short, for example.

In the embodiment example under consideration, the solid electrolyte 16 can also be produced from scandium-stabilized or yttrium-stabilized zirconium oxide (ScSZ, YSZ). It is furthermore also possible for it to be produced from a combination of these two materials. Solid electrolytes of this kind exhibit highly selective oxygen ion conduction but require relatively high operating temperatures of, typically, at least 600° C. Mention may be made at this point of the fact that iron(II) oxide (FeO), in which iron is present as a bivalent metal, is stable at these temperatures.

As with the air electrode 12, there are requirements on the material and the structure as well as technical solutions for the second electrode 14 which are known from the prior art relating to high-temperature fuel cells (Solid Oxide Fuel Cell, SOFC). Examples of materials which meet the requirements are porous nickel (Ni) or Ni/YSZ cermet.

The energy store furthermore contains a fluidic redox pair, which is connected both to the store 18 and to the second electrode 14. In the embodiment example under consideration, the fluidic redox pair comprises hydrogen as an oxidation reactant and steam as an oxidation product. By means of a replenishment line 10 and a discharge line 11, a quantity of the fluidic redox pair can be fed into and discharged from the high-temperature chamber 6. It is thereby possible to ensure a sufficient supply of steam and reliably to discharge displaced steam and possibly reuse it. The pressure maintained in the steam flow is above the ambient pressure outside the high-temperature chamber 6. In the event of leaks, the steam then escapes from the high-temperature chamber, making it possible to prevent air ingress (air penetration) and the associated uncontrolled oxidation of the first redox pair. On the one hand, the steam flow through the high-temperature chamber 6 should be great enough to compensate for losses due to leaks but, on the other hand, the flow selected should not be too great so as to displace as little hydrogen as possible. Displaced hydrogen can be recovered only with a high technical outlay and would furthermore lead to a reduction in the efficiency of the energy store.

The internal processes during the charging of a cell in the stack of the energy store are shown in FIG. 3. As illustrated in FIG. 3, the cell is connected to a direct current voltage source 26 via the interconnectors 24a, 24b, the end plates (not shown) and the incoming and outgoing electric leads 24c, 24d of the energy store. Here, the negative terminal of the direct current voltage source 26 is applied via electric contact 24d to the interconnector 24b connected to the second electrode 14, and the positive terminal is connected via electric contact 24c to the interconnector 24a connected to the air electrode 12. As a result, the second electrode 14 is supplied with electrons which lead to the occurrence there of water electrolysis, wherein oxygen ions O2− are formed at the second electrode 14 by means of the electrons supplied and are transmitted into the electrolyte. The oxygen ions are transmitted by the electrolyte 14 to the air electrode 12, where they release electrons to form molecular oxygen, which is released to the process gas duct 20 and carried away via the latter. The electrons released by the oxygen ions in the air electrode 12 are transmitted to the direct current source 26, thus closing the circuit. The hydrogen formed by electrolysis in the steam duct 22 reduces the metal of the storage electrode 18, being oxidized into water again, which can then once again be subjected to electrolysis at the second electrode 14. This process continues until there is no more metal oxide left or the amount of metal oxide available is so small that no further reduction takes place. After this, the energy store is fully charged.

The discharging of the energy store is illustrated in FIG. 4. During discharge, a load, represented in FIG. 4 by a resistor 28, is inserted into the circuit instead of the direct current source 26. For discharge, the air electrode 12 is supplied with air via the process gas duct 20, and the air electrode 12 dissociates the atmospheric oxygen and forms oxygen ions $O^{2-}$. During this process, electrons are taken from the air electrode 12, resulting in the formation of a positive potential at the latter. The oxygen ions are transmitted to the second electrode 14 by the electrolyte 16. There, they oxidize hydrogen gas to steam, with electrons being donated to the second electrode 14, resulting in the formation of a negative potential there. The steam formed then in turn oxidizes the metal of the storage electrode 18 to form a metal oxide, the steam being reduced to hydrogen, which can be oxidized again at the second electrode 14. A load 28 can be connected by means of the electric contacts 24c, 24d on the end plates. The excess electrons present in the second electrode 14 can then flow via interconnector 24b and the associated electric contact 24d to the load and, from there, to the air electrode 12 via electric contact 24c and the interconnector 24a connected to the latter. This process can continue until further oxidation of the storage electrode 18 is no longer possible and the energy store has thus been discharged.

The charging and discharge processes described take place at temperatures of 600° C. or above. The cells described with reference to FIGS. 3 and 4 are therefore in the form of one or more cell stacks 6a in the thermally insulated high-temperature chamber 6 already described above in order to enable the temperature to be kept in this range of 600° C. or above with as little effort as possible. In order to reduce cooling by the flowing process gas, that is to say, in the present example, by the air, the process gas is preheated, thus reducing the temperature difference between the process gas and the stack 6*a*. Preheating of the air takes place in the heat exchanger 4, where the air flowing into the stack 6*a* is heated by the waste heat of the air emerging from the stack 6*a* before the air that has emerged is discharged into the surroundings.

Figure 5:
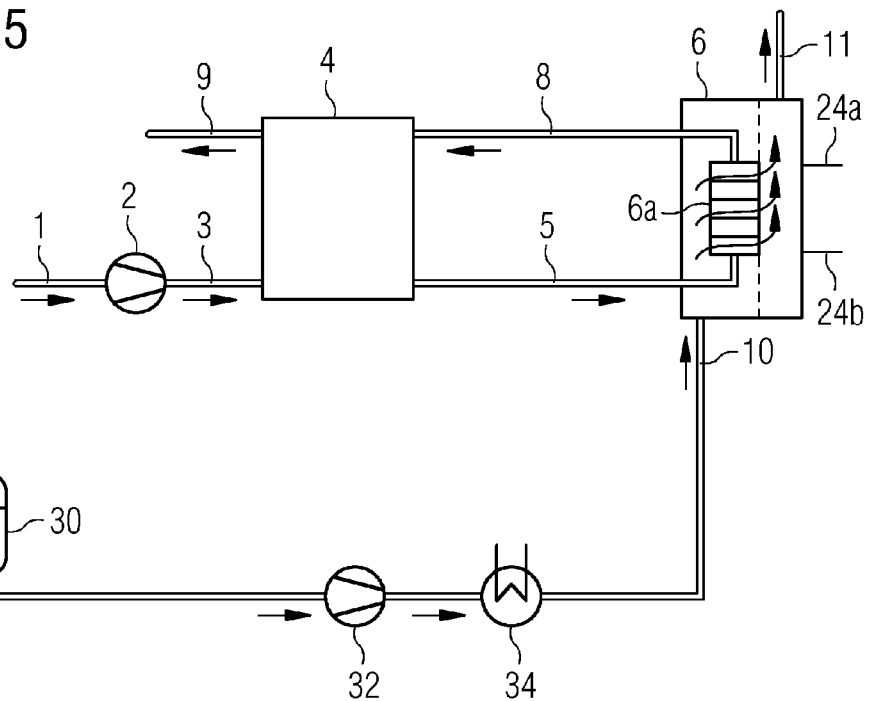
FIG. 5 shows the energy store from FIG. 2 with a reservoir of fluidic redox pair.

A variant embodiment of the energy store, which has a storage volume 30 for storing the at least one oxidation product or an oxidation reactant of the fluidic redox pair, is illustrated in FIG. 5. An additional quantity of fluidic redox pair can be added to the high-temperature chamber 6 from the storage volume when required. In order to minimize the storage volume, the steam present in the fluidic redox pair in the embodiment example under consideration is not stored in the form of steam but in the form of water. The water can be fed by means of a pump 32 to an evaporator 34, where the water is evaporated and then fed to the high-temperature chamber 6 via the replenishment line 10. Displaced steam can be discharged in corresponding fashion into the surroundings through the discharge line 11. In a development of this variant, there is the possibility of not discharging displaced steam into the surroundings but of feeding it back into the storage reservoir 30. For this purpose, the discharge line 11 is connected to a heat exchanger, which serves as a cooler or condenser 36. Via a return line 38, the condensed water is then returned to the storage reservoir 30. In the example under consideration, the storage reservoir 30 is arranged underneath the condenser 36, and therefore the return from the condenser 36 to the storage reservoir 30 is brought about by gravity.

A number of different ways of supplying the evaporator 34 with the energy required to evaporate the water are available. Since the steam flow through the high-temperature chamber 6 is relatively small in comparison with the air flow, the evaporator 34 can contain an electric heating element which supplies the water with the thermal energy required for evaporation without resulting in excessive energy consumption by the evaporator 34. As an alternative, however, it is also possible to use the waste heat of the air leaving the cell stack 6*a* to evaporate the water. There are two possible variants here, these being illustrated in FIGS. 7 and 8.

In the variant illustrated in FIG. 7, the heat exchanger 34 is connected by a branch line 40 to the exhaust line 8, which is situated between the cell stack 6*a* and the heat exchanger 4. The mass flow of air diverted can be adjusted by means of an adjustable restrictor 42 arranged in the branch line 40. Adjustment is accomplished here by setting a suitable pressure drop across the restrictor 42. If the temperature of the exhaust air flowing in the exhaust line 8 is too high for use in the heat exchanger 34, the temperature of the partial air flow flowing through the branch line 40 can be lowered by means of an optional cooler 44 to a temperature suitable for the evaporator 34.

In the variant illustrated in FIG. 8 for using the waste heat of the air emerging from the cell stack 6*a,* the partial air flow for the evaporator 34 is not diverted from the exhaust line 8 leading from the cell stack 6*a* to the heat exchanger 4 but from an exhaust line 46 connected downstream of the heat exchanger 4, from where a branch line 48 leads to the heat exchanger 34. The exhaust line 46 connected downstream of the heat exchanger leads to a restrictor 50, which is adjustable as regards the pressure drop that takes place therein. By means of the pressure drop across the restrictor 50, it is possible to adjust the pressure in the exhaust line 46, and this also has an effect on the pressure in the branch line 48 leading to the evaporator 34. By means of the adjustable restrictor 50, it is thus possible to adjust the mass flow passed to the evaporator 34. There is generally no need for a cooler in the branch line 48 since the temperature of the exhaust air is reduced after passing through the heat exchanger 4. Normally, however, it is still sufficient to bring about evaporation of the water in the evaporator 34.

The invention, which has been described in detail by means of the embodiment examples, shows a technical solution and an arrangement of components for sealing a battery, in which electric energy is stored in the oxidation state of a redox pair, against air penetration. Sealing is accomplished by means of a fluidic redox pair. To compensate for any losses of fluidic redox pair which may occur, water can be pumped out of a storage reservoir into an evaporator with the aid of a pump. The steam which forms there is passed to the energy store. As well as acting as a sealing medium, the fluidic redox pair also serves there to improve the reaction kinetics and hence to boost the power of the battery.

Overall, all the embodiment examples described allow an increased power density in the energy store and steam supply with little technical effort. At the same time, there is no noticeable mass transfer between the exhaust air and water, and the energy store is protected from air penetration by reason of the increased pressure of the steam in comparison with the ambient pressure.

Although the invention has been described by means of specific embodiment examples for purposes of illustration, the invention should not be restricted to these embodiment examples. In particular, deviations from the exemplary embodiment examples are possible. Thus, instead of steam and hydrogen, some other fluidic redox pair may be present. For example, it would be conceivable to use methane ($CH_4$) as the oxidation reactant. The oxidation products would then be steam and carbon dioxide, and therefore there would be two oxidation products present. Where the fluidic redox pair is mentioned in the context of the present invention, this term is also intended to include the case where more than one oxidation product and/or more than one oxidation reactant is present in the fluidic redox pair.

Figure 6:
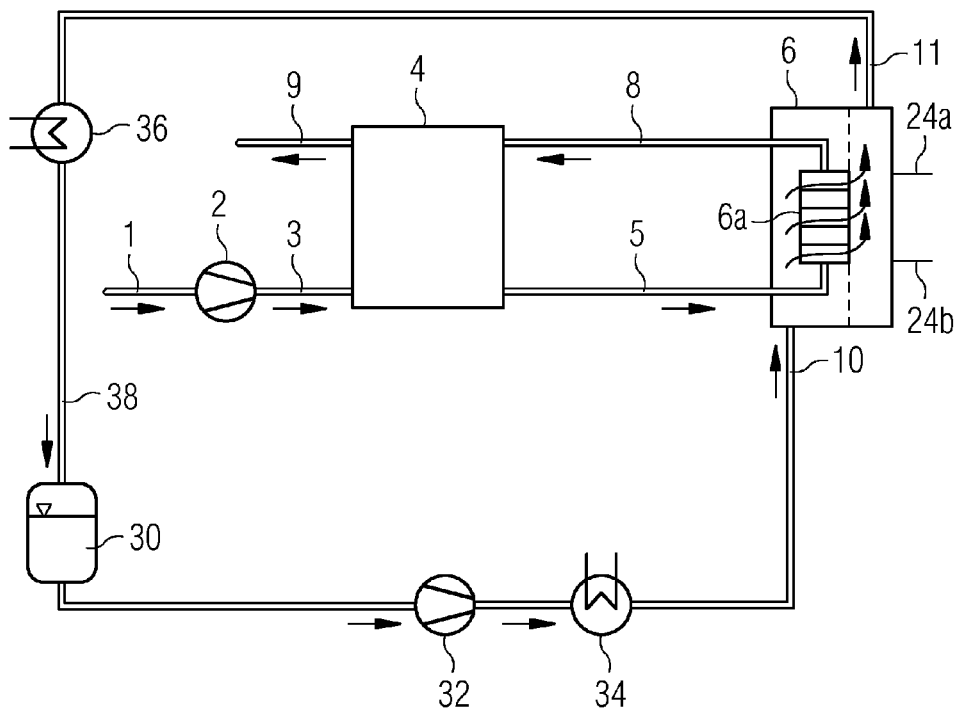
FIG. 6 shows the energy store from FIG. 2 having a circuit for the fluidic redox pair.

In the case of the variant embodiment illustrated in FIG. 7, there is furthermore the possibility, instead of a cooler 44, of providing just an uninsulated piece of branch line 40, which is likewise suitable in principle for dissipating heat from the partial flow and can therefore perform the cooling function. A similar statement applies to the cooler 36 in the circuit shown in FIG. 6. This too can be replaced by an uninsulated section of the line. Moreover, the circuit illustrated in FIG. 6 is designed in such a way that the condensed water is returned to the storage reservoir 30 solely by means of gravity. As an alternative, there is also the possibility of performing return by means of a pump. This increases the degrees of freedom in the arrangement of the circuit since the storage reservoir 30 then no longer needs to be lower than the cooler 36.

The invention claimed is:

1. A method for charging or discharging an energy store having a first electrode, which, by donating electrons to a component of a process fluid, can produce anions from said component or, by accepting electrons from anions, can consume said anions by neutralization of the charge thereof and release to the process fluid, a second electrode, which, by releasing electrons, can produce anions or, by accepting electrons, can consume anions, an electrolyte, which is arranged between the first electrode and the second electrode and conducts anions, and a first redox pair, which comprises a first oxidation reactant and a first oxidation product, in which the first oxidation product is reduced in order to charge the energy store, and the first oxidation reactant is oxidized in order to discharge the energy store, wherein use is made of a fluidic redox pair which comprises a fluidic oxidation reactant and a fluidic oxidation product and is in contact with the first redox pair and the second electrode, during the discharge of the energy store, the fluidic oxidation product is reduced to the fluidic oxidation reactant at the first oxidation reactant, producing the first oxidation product in the process, and the fluidic oxidation reactant is oxidized to the fluidic oxidation product at the second electrode by means of the anions, donating electrons to the second electrode in the process, and during the charging of the energy store, the fluidic oxidation reactant is oxidized to the fluidic oxidation product at the first oxidation product, producing the first oxidation reactant in the process, and the fluidic oxidation product is reduced to the fluidic oxidation reactant at the second electrode, wherein anions are generated at the second electrode by accepting electrons from the second electrode, wherein the fluidic redox pair is gaseous during the oxidation and reduction, and wherein a pressure above the ambient pressure of the medium surrounding the energy store is maintained in the fluidic redox pair.

2. The method as claimed in claim 1, wherein the first redox pair comprises a metal and the oxide thereof or two different oxidation stages of a metal, and the fluidic redox pair comprises steam as an oxidation product.

3. The method as claimed in claim 1, wherein the fluidic redox pair is passed along the first redox pair.

4. The method as claimed in claim 3, wherein the fluidic redox pair is circulated in a circuit and, as it circulates, is passed along the first redox pair.

5. The method as claimed in claim 3, wherein the oxidation product and/or the oxidation reactant of the fluidic redox pair is/are liquid and is/are evaporated before it/they is/are passed to the first redox pair.

6. The method as claimed in claim 5, wherein the energy store is held at a high temperature, and the energy required for evaporating the oxidation product and/or the oxidation reactant of the fluidic redox pair is obtained from waste heat of the process fluid.

7. The method as claimed in claim 6, wherein the process fluid fed to the energy store is heated before being fed to the energy store, wherein the heating is accomplished by means of waste heat contained in the process fluid after discharge from the energy store, and wherein the energy required for evaporating the oxidation product and/or the oxidation reactant of the fluidic redox pair is obtained from residual heat still contained in the discharged process fluid after the heating of the process fluid fed to the energy store.

8. The method as claimed in claim 5, wherein the oxidation product and/or the oxidation reactant of the fluidic redox pair is/are condensed after it/they has/have been passed along the first redox pair.

9. An energy store comprising:
a first electrode, which is arranged in such a way that a process fluid can be guided along it and which comprises a material which, by donating electrons to a component of the process fluid, can produce anions from said component or, by accepting electrons from anions, can consume said anions by neutralization of the charge thereof and release to the process fluid;
a second electrode comprising a material which, by releasing electrons, can produce anions or, by accepting electrons, can consume anions;
an electrolyte, which is arranged between the first electrode and the second electrode and conducts anions;
a first redox pair, which comprises a first oxidation reactant and a first oxidation product; and
a housing, which is sealed against the entry of the medium surrounding the housing but allows the supply of process fluid to the first electrode, wherein
a fluidic redox pair is present in the interior of the housing between the second electrode, on the one hand, and the first redox pair, on the other hand, and comprises a fluidic oxidation reactant and a fluidic oxidation product, and in which
during the discharge of the energy store, the fluidic oxidation product is reduced to the fluidic oxidation reactant at the first oxidation reactant, producing the first oxidation product in the process, and the fluidic oxidation reactant is oxidized to the fluidic oxidation product at the second electrode by means of the anions, donating electrons to the second electrode in the process, and
during the charging of the energy store, the fluidic oxidation reactant is oxidized to the fluidic oxidation product at the first oxidation product, producing the first oxidation reactant in the process, and the fluidic oxidation product is reduced to the fluidic oxidation reactant at the second electrode, wherein anions are generated at the second electrode by accepting electrons from the second electrode,
wherein the fluidic redox pair in the housing is gaseous, and
further comprising a pump or a compressor, adapted such that the fluidic redox pair within the housing is held at a pressure which is above the ambient pressure outside the housing.

10. The energy store as claimed in claim 9, wherein the housing has at least one feed line for feeding in the fluidic redox pair.

11. The energy store as claimed in claim 9, further comprising an evaporator, which converts the fluidic redox pair from a liquid state to the gaseous state and which has a steam outlet connected via the feed line to the housing.

12. The energy store as claimed in claim 11, further comprising a high temperature of the energy store and a heat exchanger, through which the liquid oxidation product and/or the liquid oxidation reactant of the fluidic redox pair flow/flows and to which process fluid that has emerged from the energy store is fed by means of a process fluid branch line in order to transfer waste heat to the liquid oxidation product and/or the liquid oxidation reactant.

* * * * *